US012648502B2

(12) United States Patent
Fanshier et al.

(10) Patent No.: US 12,648,502 B2
(45) Date of Patent: Jun. 9, 2026

(54) AGRICULTURAL IMPLEMENTS HAVING ROW UNIT POSITION SENSORS AND AT LEAST ONE ADJUSTABLE WHEEL, AND RELATED CONTROL SYSTEMS AND METHODS

(71) Applicant: AGCO Corporation, Duluth, GA (US)

(72) Inventors: Benjamin Anson Fanshier, Hesston, KS (US); Monte J. Rans, Hesston, KS (US); Ross Duerksen, Hesston, KS (US); Zane Wesley Unrau, Hesston, KS (US); Robert L. Figger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 830 days.

(21) Appl. No.: 17/818,875

(22) PCT Filed: Feb. 17, 2021

(86) PCT No.: PCT/IB2021/051309
§ 371 (c)(1),
(2) Date: Aug. 10, 2022

(87) PCT Pub. No.: WO2021/205245
PCT Pub. Date: Oct. 14, 2021

(65) Prior Publication Data
US 2024/0188472 A1 Jun. 13, 2024

Related U.S. Application Data

(60) Provisional application No. 63/007,114, filed on Apr. 8, 2020.

(51) Int. Cl.
*A01B 63/22* (2006.01)
*A01B 63/00* (2006.01)
*A01C 7/20* (2006.01)

(52) U.S. Cl.
CPC ............ *A01B 63/22* (2013.01); *A01B 63/002* (2013.01); *A01C 7/203* (2013.01)

(58) Field of Classification Search
CPC ...................................................... A01C 7/203
See application file for complete search history.

(56) References Cited

U.S. PATENT DOCUMENTS

| | | | |
|---|---|---|---|
| 4,077,475 A | 3/1978 | Hino et al. | |
| 4,173,259 A | 11/1979 | Heckenkamp | |

(Continued)

FOREIGN PATENT DOCUMENTS

| | | |
|---|---|---|
| DE | 3208246 A1 | 9/1983 |
| DE | 102017103646 B4 | 6/2023 |

(Continued)

OTHER PUBLICATIONS

UK Intellectual Property Office, Search report for related UK Application No. GB2005944.0, dated Oct. 21, 2020.

(Continued)

*Primary Examiner* — Christopher J Sebesta
*Assistant Examiner* — Joel F. Mitchell

(57) ABSTRACT

An agricultural implement includes a frame having an integrated elongate toolbar carrying at least one row unit, at least one wheel coupled to the frame, a sensor configured to sense a position of the row unit relative to the ground, and an actuator configured to raise or lower the frame relative to the wheel based at least in part on a sensed position of the row unit. Control systems and related methods are also disclosed.

8 Claims, 5 Drawing Sheets

(56) References Cited

U.S. PATENT DOCUMENTS

| | | | |
|---|---|---|---|
| 4,775,940 A | 10/1988 | Nishida et al. | |
| 5,392,863 A | 2/1995 | Fixemer | |
| 5,653,292 A | 8/1997 | Ptacek et al. | |
| 6,076,611 A | 6/2000 | Rozendaal et al. | |
| 7,938,074 B2 | 5/2011 | Liu | |
| 8,448,717 B2 | 5/2013 | Adams et al. | |
| 8,857,530 B2 * | 10/2014 | Henry | A01B 63/114 |
| | | | 172/4 |
| 9,078,391 B2 | 7/2015 | Pichlmaier | |
| 9,086,699 B2 | 7/2015 | Pirotais | |
| 9,706,696 B2 | 7/2017 | Gschwendtner | |
| 11,612,096 B2 | 3/2023 | Sivinski | |
| 11,730,077 B2 | 8/2023 | Sauder et al. | |
| 2010/0319941 A1 | 12/2010 | Peterson | |
| 2011/0184551 A1 | 7/2011 | Kowalchuk | |
| 2014/0124225 A1 * | 5/2014 | Sauder et al. | A01B 73/06 |
| | | | 172/430 |
| 2015/0230391 A1 | 8/2015 | Houck | |
| 2017/0118901 A1 | 5/2017 | Stark | |
| 2017/0359941 A1 | 12/2017 | Czapka et al. | |
| 2018/0014450 A1 | 1/2018 | Dienst et al. | |
| 2018/0077849 A1 | 3/2018 | Fashier et al. | |
| 2018/0153088 A1 | 6/2018 | Sporrer et al. | |
| 2019/0021211 A1 | 1/2019 | Gutknecht et al. | |
| 2019/0126912 A1 | 5/2019 | Peterson et al. | |
| 2019/0254223 A1 | 8/2019 | Eichhorn et al. | |
| 2020/0029484 A1 | 1/2020 | Weidenbach et al. | |
| 2020/0084951 A1 | 3/2020 | Fanshier et al. | |
| 2020/0100420 A1 | 4/2020 | Sporrer et al. | |
| 2020/0100421 A1 | 4/2020 | Wang | |
| 2020/0116479 A1 | 4/2020 | Shearer et al. | |
| 2020/0236843 A1 | 7/2020 | Graham et al. | |
| 2020/0305334 A1 | 10/2020 | Forbes et al. | |
| 2021/0235611 A1 * | 8/2021 | Fett | A01C 7/203 |
| 2021/0315148 A1 * | 10/2021 | Fanshier et al. | A01B 63/1112 |
| 2022/0053685 A1 * | 2/2022 | Maro | A01B 63/008 |
| 2022/0272888 A1 * | 9/2022 | Hodel et al. | A01B 63/008 |

FOREIGN PATENT DOCUMENTS

| | | | | |
|---|---|---|---|---|
| EP | 0241748 A2 | 10/1987 | | |
| EP | 2462794 B1 | 11/2018 | | |
| GB | 1154811 A | 6/1969 | | |
| JP | H07147809 A | 6/1995 | | |
| JP | 2016096743 A | 5/2016 | | |
| JP | 2020156392 A | 10/2020 | | |
| WO | 2018109545 A1 | 6/2018 | | |
| WO | WO-2019157521 A1 * | 8/2019 | | A01C 7/205 |

OTHER PUBLICATIONS

European Patent Office, International Search Report related to International Patent Application No. PCT/IB2021/051309, mail date May 3, 2021.

* cited by examiner

600

602

Receive indication of position of row unit relative to ground sensed by sensor

604

Cause actuator to rotate arm coupling wheel with respect to frame based on sensed position of row unit

700

702

704

706

708

AGRICULTURAL IMPLEMENTS HAVING ROW UNIT POSITION SENSORS AND AT LEAST ONE ADJUSTABLE WHEEL, AND RELATED CONTROL SYSTEMS AND METHODS

CROSS-REFERENCE TO RELATED APPLICATION APPLICATIONS

This application is a national phase entry under 36 U.S.C. § 371 of International Patent Application PCT/IB2021/051309, filed Feb. 17, 2021, designating the United States of America and published in English as International Patent Publication WO 2021/205245 A1 on Oct. 14, 2021, which claims the benefit of the filing date of U. S. Provisional Patent Application 63/007,114, "Agricultural Implements Having Row Unit Position Sensors and at Least One Adjustable Wheel, and Related Control Systems and Methods," filed Apr. 8, 2020, the entire disclosure of which is incorporated herein by reference.

FIELD

Embodiments of the present disclosure relate generally to machines and methods for working agricultural fields. In particular, embodiments relate to implements (e.g., planters, tillage, etc.) and to methods of controlling such implements.

BACKGROUND

Crop yields are affected by a variety of factors, such as seed placement, soil quality, weather, irrigation, and nutrient applications. Seeds are typically planted in trenches formed by discs or other mechanisms of a planter row unit. Depth of seed placement is important because seeds planted at different depths emerge at different times, resulting in uneven crop growth. Trench depth can be affected by soil type, moisture level, row unit speed, and operation of the opening discs. It would be beneficial to have improved methods of controlling the location of planter row units so that seeds can be more precisely placed in a field.

BRIEF SUMMARY

In some embodiments, an agricultural implement includes a frame having an integrated elongate toolbar carrying at least one row unit, at least one wheel coupled to the frame, a sensor configured to sense a position of the at least one row unit relative to the ground, and an actuator configured to raise or lower the frame relative to the at least one wheel based at least in part on a sensed position of the at least one row unit.

Other embodiments include a control system for an implement including a frame having an integrated elongate toolbar carrying at least one row unit and at least one wheel coupled to the frame. The control system includes an actuator connecting the at least one wheel to the frame, a sensor configured to sense a position of the at least one row unit relative to the ground, and a controller. The controller is configured to receive a signal from the sensor indicating the position of the at least one row unit relative to the ground and cause the actuator to raise or lower the frame based on the sensed position of the at least one row unit.

Certain embodiments include a computer-implemented method for operating an implement that includes a frame having an integrated elongate toolbar carrying at least one row unit and at least one wheel coupled to the frame. The method includes receiving an indication of a position of the at least one row unit relative to the ground sensed by a sensor, and causing an actuator to raise or lower the frame relative to the at least one wheel based at least in part on the indication of the position of the at least one row unit.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

Figure 1:
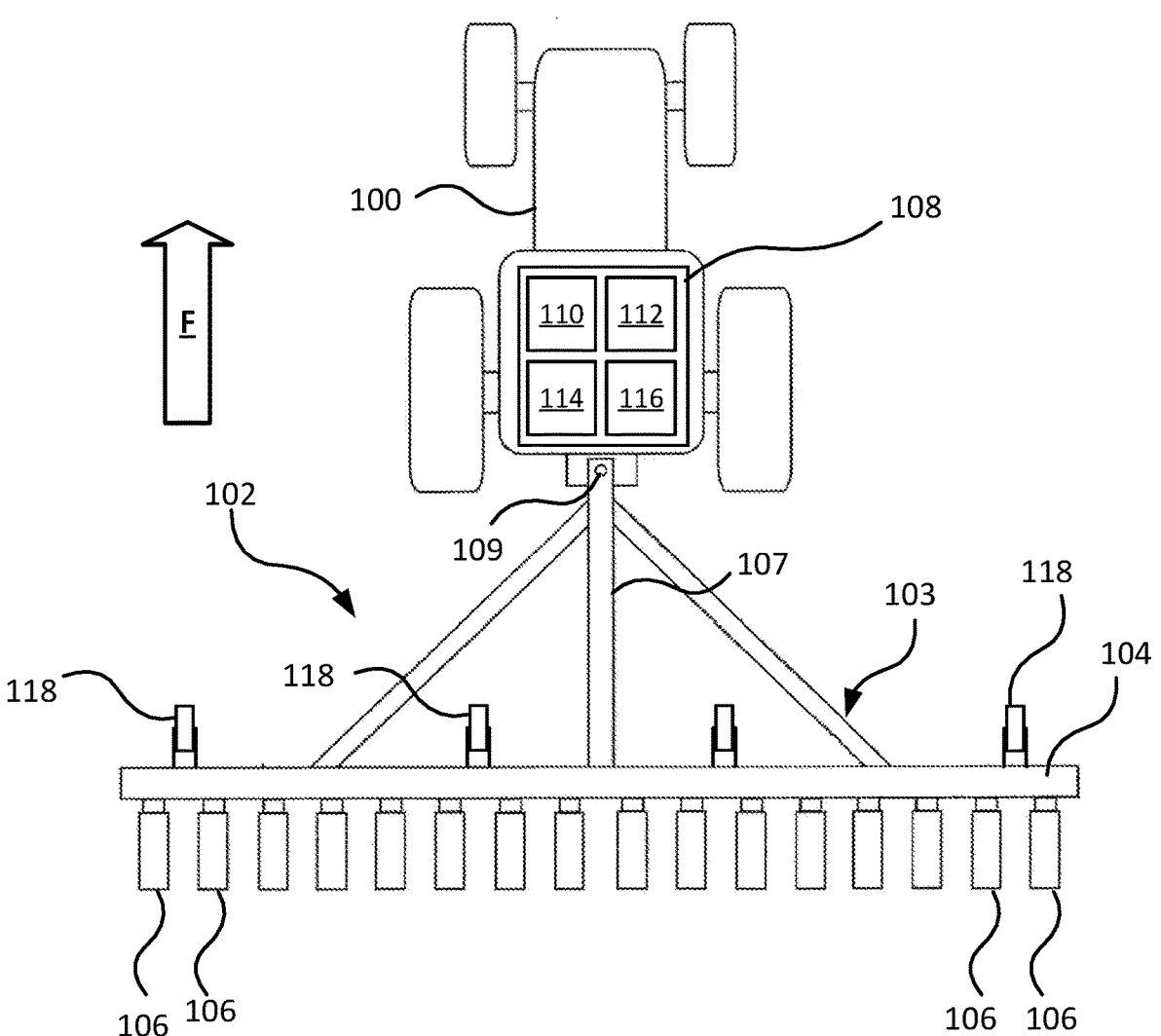
FIG. 1 is a simplified top view of a tractor pulling an implement in accordance with one embodiment.

The illustrations presented herein are not actual views of any implement or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates a tractor 100 drawing an agricultural implement 102, which has a frame 103 including an integrated toolbar 104 supporting row units 106. A computer 108, which may include a central processing unit ("CPU") 110, memory 112, implement controller 114, and graphical user interface ("GUI") (e.g., a touch-screen interface), is typically located in the cab of the tractor 100. A global positioning system ("GPS") receiver 116 may be mounted to the tractor 100 and connected to communicate with the computer 108. The computer 108 may include an implement controller 114 configured to communicate with the row units 106 and/or the GPS receiver 116, such as by wired or wireless communication. The implement 102 may be supported in the field by at least one wheel 118 coupled to the toolbar 104. Typically, the toolbar 104 is attached to at least two wheels 118, such as to four wheels as shown in FIG. 1. The frame 103 may also include a drawbar 107, hitch 109, and other supporting structure to connect to the tractor 100. Thus, the frame 103 may be a rigid structure supporting the row units 106.

Figure 2:
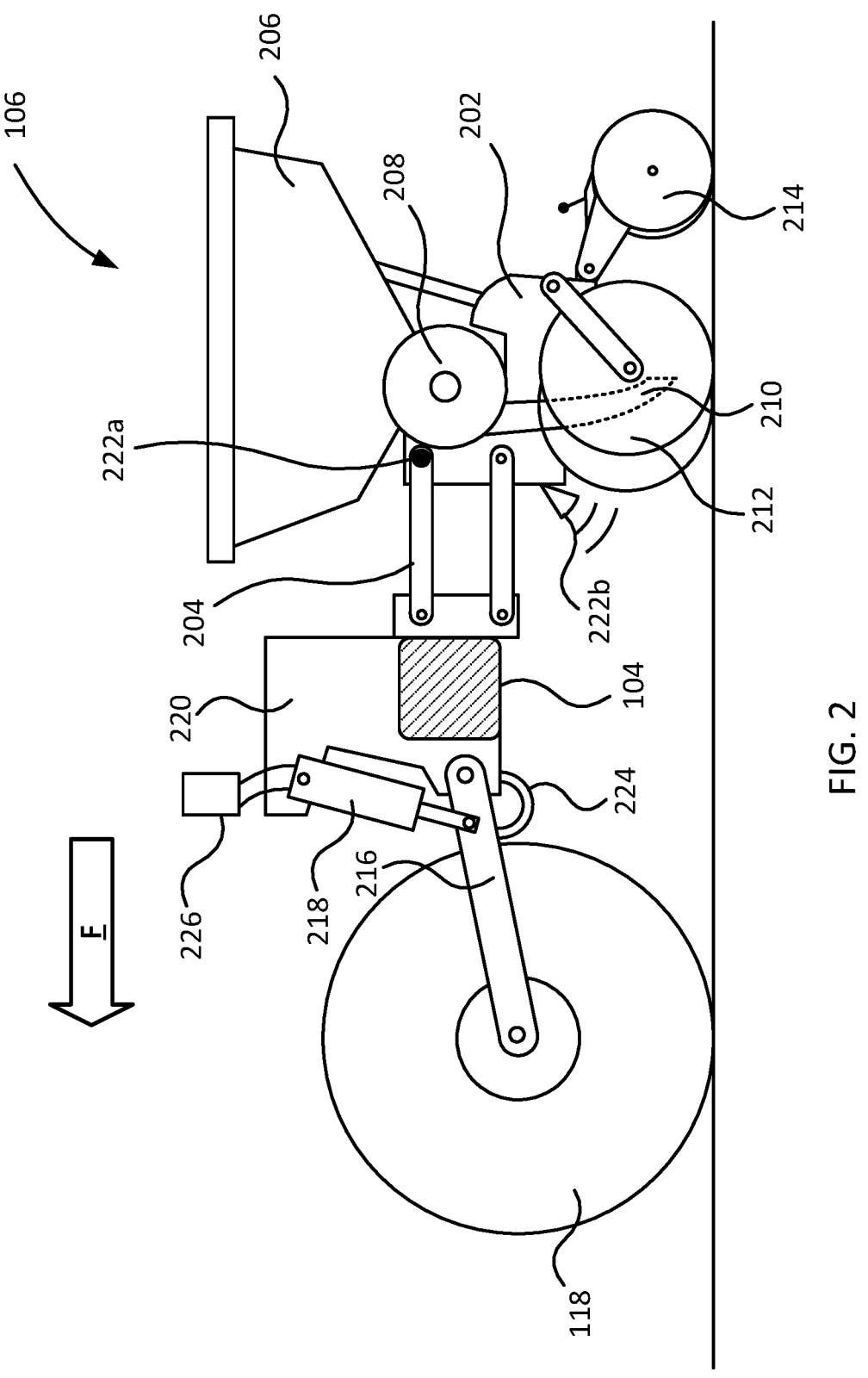
FIG. 2 is a simplified side view of a portion of the implement shown in FIG. 1.

The row units 106 may be any type of ground-engaging device for planting, seeding, fertilizing, tilling, or otherwise working crops or soil, typically in rows. As an example, FIG. 2 is a simplified side view illustrating a row unit 106 in the form of a planter row unit. The row unit 106 has a body 202 pivotally connected to the toolbar 104 by a parallel linkage 204, enabling the row unit 106 to move vertically independent of the toolbar 104. In some embodiments, the body 202 of the row unit 106 may be connected to the toolbar 104 by another structure, such as a rotating arm. The body 202 may be a unitary member, or may include one or more members coupled together (e.g., by bolts, welds, etc.). The body 202 operably supports one or more hoppers 206, a seed meter 208, a seed delivery mechanism 210, a seed trench opening assembly 212, a trench closing assembly 214, and any other components as known in the art. It should be understood that the row unit 106 shown in FIG. 2 may optionally be a part of a central fill planter, in which case the hoppers 206 may be one or more mini-hoppers fed by a central hopper carried by the implement 102.

The wheel(s) 118 are each coupled to the toolbar 104 or another part of the frame 103, such as by an arm 216, a parallel linkage, or other structure. As shown in FIG. 1, the implement 102 may include a wheel 118 near each end of the toolbar 104, and may also include other wheels 118 in between. In some embodiments, the wheels 118 may be used to spread the load of the implement 102, and thus a higher number of wheels may correspond to a lower compaction force on the ground.

The height of each wheel 118 may be independently adjustable by adjusting the arm 216 or other structure to which the wheel 118 is attached. For instance, rotation of the arm 216 relative to the toolbar 104 may be controlled by adjusting the length of an actuator 218 coupled to the arm 216 and the toolbar 104 (such as via a mount or bracket 220 attached to the toolbar 104). The actuator(s) 218 may be configured to rotate the arm(s) 216 to raise and/or lower the wheel relative to the frame 103 (and the integrated toolbar 104) to maintain the row units 106 at a preselected position relative to the ground. That is, rotation of the arm(s) 216 or adjustment of other structure coupling the wheel(s) 118 to the frame 103 causes the frame 103 (and particularly the toolbar 104 thereof) to raise or lower relative to the ground.

At least one sensor 222a and/or 222b may be used to determine a position of a row unit 106 relative to the ground. As shown in FIG. 2, the sensor(s) 222a, 222b may be carried on the body 202 of the row unit 106 itself. In other embodiments, sensor(s) may be carried by the toolbar 104, the tractor 100, or even by another vehicle (e.g., another ground vehicle, an unmanned aerial vehicle, etc.). The sensor 222a may be a rotary sensor configured to measure an angle of an element of the parallel linkage 204 relative to the body 202 of the row unit 106 or to the toolbar 104, and may be connected to a pivot point of the body 202 of the row unit 106 or to the toolbar 104. The sensor 222b depicted may include a non-contact depth sensor, for example, an optical sensor, an ultrasonic transducer, an RF (radio frequency) sensor, lidar, radar, etc. Such sensors are described in, for example, U.S. Patent Application Publication 2019/0075710, "Seed Trench Depth Detection Systems," published Mar. 14, 2019. The sensor(s) 222a, 222b may provide information that can be used to adjust the actuator(s) 218. At least one additional sensor 224 may be used to determine a position of the wheel 118 relative to the toolbar 104 (e.g., by changing an angle of the arm 216 relative to the toolbar 104). This information can be used to determine the position of the toolbar 104 relative to the ground. In some embodiments, the additional sensor 224 may be integrated with the actuator 218 (e.g., a sensor configured to detect the position of the actuator 218, rather than the arm 216 itself).

Figure 3:
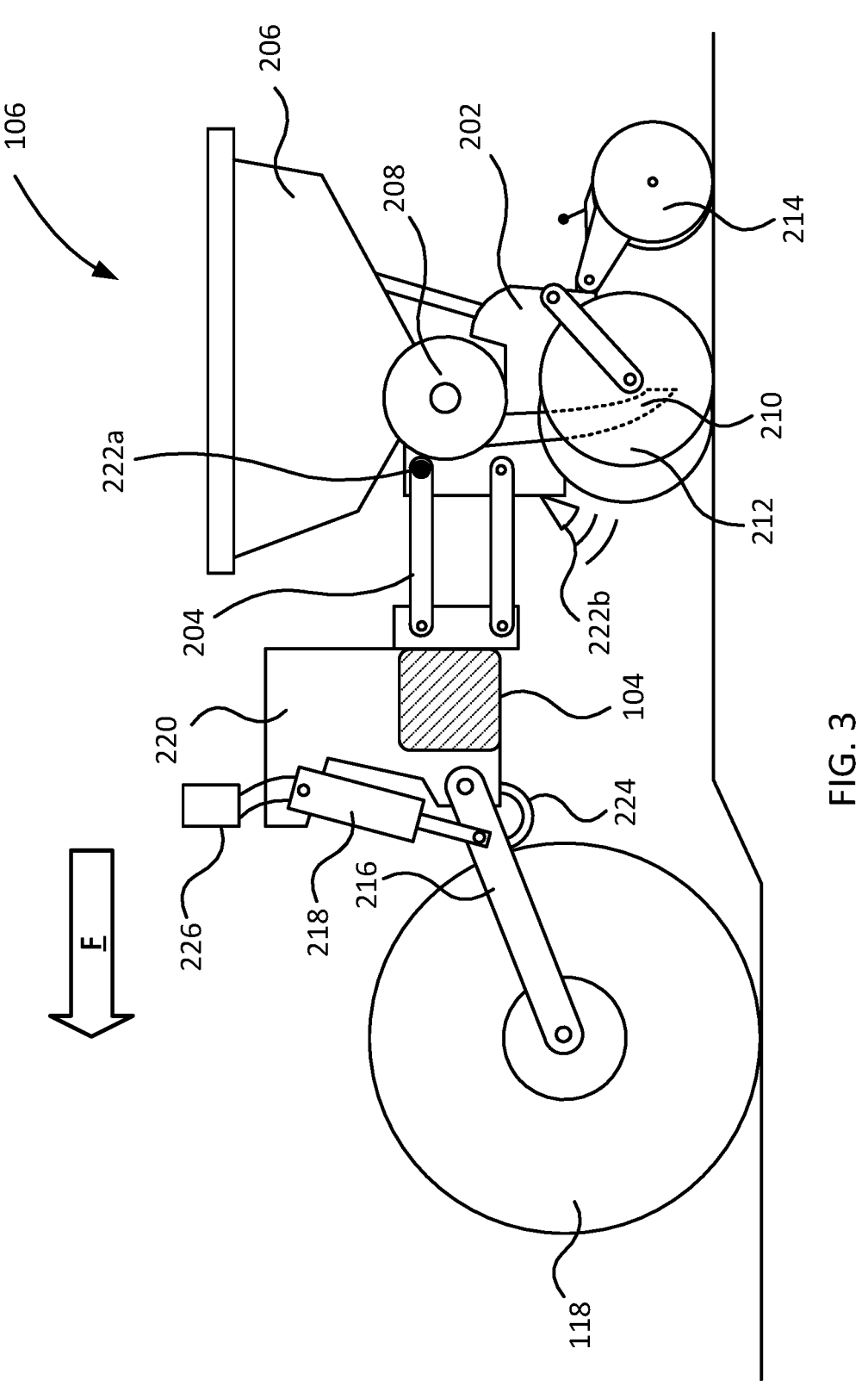
FIG. 3 is a simplified side view of a portion of the implement shown in FIG. 1 traveling down a grade.

The implement 102 traveling through a field in a forward direction F may encounter variations in field elevation and/or slope. The sensor(s) 222, 224 detect the position of the row unit and optionally, the toolbar 104, relative to the ground surface, and send signals to the implement controller 114 (FIG. 1). As depicted in FIG. 3, the wheel 118, which leads the row unit 106, is at a point in the field having a lower elevation or grade than the row unit 106. The actuator 218 lengthens to maintain the row unit 106 at a constant height above the ground surface, as measured by the sensor 222. When the wheel 118 is at a point having a higher elevation than the row unit 106, the actuator 218 shortens. As will be apparent to those skilled in the art, the direction of movement of the actuator 218 may be reversed by changing the points at which the actuator 218 connects to the arm 216 and the toolbar 104. Furthermore, though the actuator 218 is illustrated as a piston-type actuator, other types of actuators may also be used with appropriate connections to the arm 216 and the toolbar 104.

The actuators 218 may be controlled by the implement controller 114 via one or more control components 226 (illustrated as a rectangular box connected to the actuator 218) such as a control valve, an air valve, an electronic control component, a magnetic control component, or an electromagnetic control component, etc. The controller 114 may send a signal to the control components 226 to implement changes in the positions of the actuators 218.

FIGS. 1 through 3 illustrate the wheels 118 leading the row units 106 as the implement 102 travels through a field. In some embodiments, the wheels 118 may be located trailing the row units 106, or may be laterally in-line with the row units 106, with appropriate adjustments to the attachment mechanisms and operation of the actuators 218.

Figure 4:
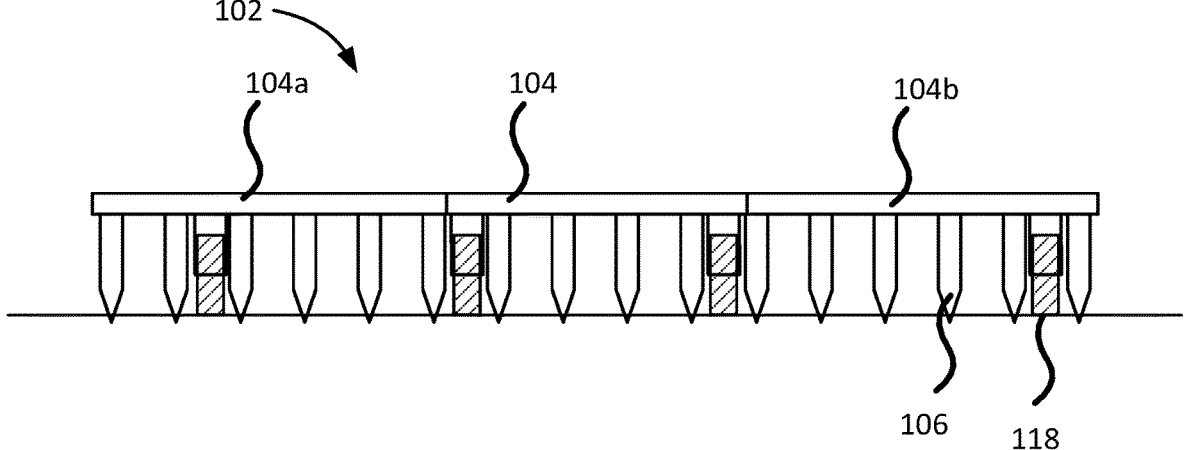
FIG. 4 is a simplified rear view the implement shown in FIG. 1 on level ground.

FIG. 4 shows a simplified rear view of the implement 102 traveling over level ground. The wheels 118 are adjusted by the actuators 218 (FIG. 2) such that the row units 106 each engage the ground. The parallel linkage 204 (FIG. 2) may adjust the depth at which an individual row unit 106 operates (e.g., plants seeds) in the ground.

Figure 5:
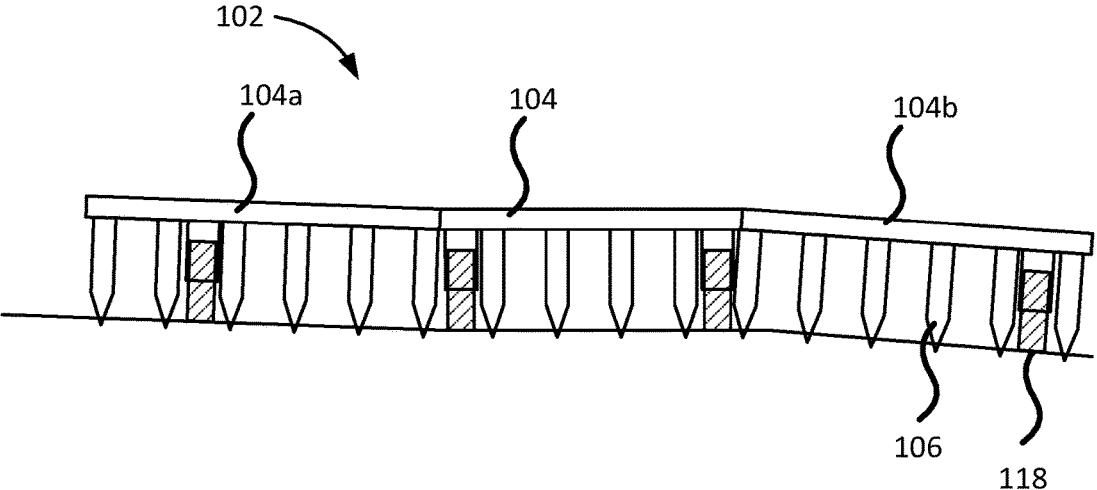
FIG. 5 is a simplified rear view the implement shown in FIG. 1 on sloped ground.

FIG. 5 shows a simplified rear view of the implement 102 traveling over sloped ground, and illustrates how the implement 102 may adjust to different terrain. In FIG. 5, the ground at the left-hand side is sloped upward from the center, the ground in the center is level, and the ground at the right-hand side is sloped downward from the center. The implement 102 may have adjustable wing sections 104a, 104b coupled to toolbar 104 or the frame 103 that can flex (i.e., move relative to one another) to match different terrain, such as described in U.S. Pat. No. 10,582,654, "Implement Load Balancing System," issued Mar. 10, 2020. The actuators 218 may adjust the wheel(s) 118 in each section relative to the frame 103 such that the row units 106, the toolbar 104, and/or the wing sections 104a, 104b remain at a preselected position with respect to the ground. That is, in addition to the parallel linkage 204, which is adjustable on a per-row-unit basis, the wheels 118 may adjust the height and/or angle of the frame 103 and integrated toolbar 104 and of each wing section 104a, 104b. Adjustment of the wheels 118 provides an additional range of adjustment. That is, the row units 106 may be adjusted by moving the toolbar 104 and wing sections 104a, 104b upward or downward (i.e., by moving the wheels 118) and by moving the row units 106 with respect to the toolbar 104 (i.e., by rotating the parallel linkage 204). Thus, each row unit 106 may exhibit a wider total range of motion than an implement 102 having only the parallel linkage 204 to adjust the height of the row unit 106 with respect to the tractor 100.

Typically, there may be multiple row units 106 on each section of the toolbar 104. Thus, movement of one wheel 118 typically changes the position of the multiple row units 106. The implement controller 114 may calculate an appropriate position of each actuator 218 so that the row units 106 on a section can each be at a preselected depth when accounting for the position of each corresponding parallel linkage 204. That is, the controller 114 may select an actuator position such that the row units 106 can each be adjusted to be at a preselected depth. The actuator 218 may enable a wider range of operating conditions (e.g., maximum field slope variation) than conventional wing control systems and may enable the implement controller 114 to respond more quickly to changing field terrain.

Though the implement 102 is described herein as a planter, the wheels 118 and actuators 218 may be used with other types of implements having row units, such as tillage implements (e.g., disc harrows, chisel plows, field cultivators, etc.) and seeding tools (e.g., grain drills, disc drills, etc.).

Figure 6:
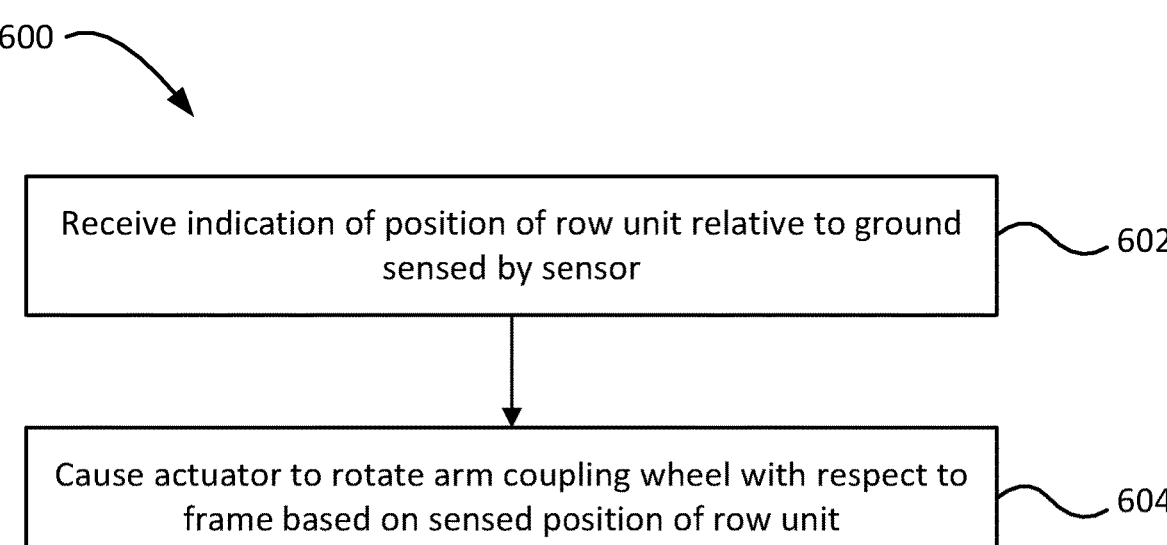
FIG. 6 is a simplified flow chart illustrating a method of operating an implement.

FIG. 6 is a simplified flow chart illustrating a computer-implemented method 600 of using the implement 102 to work an agricultural field. In block 602, an indication is received of a position of at least one row unit relative to the ground sensed by a sensor. For example, a signal from the sensor may be received by a controller. In block 604, an actuator rotates an arm relative to a frame based at least in part on a sensed position of the at least one row unit. For example, a signal may be sent to a control component associated with the actuator. In some embodiments, an angle of the arm relative to the frame may also be sensed, and that information may also be used to determine how to drive the actuator.

Figure 7:
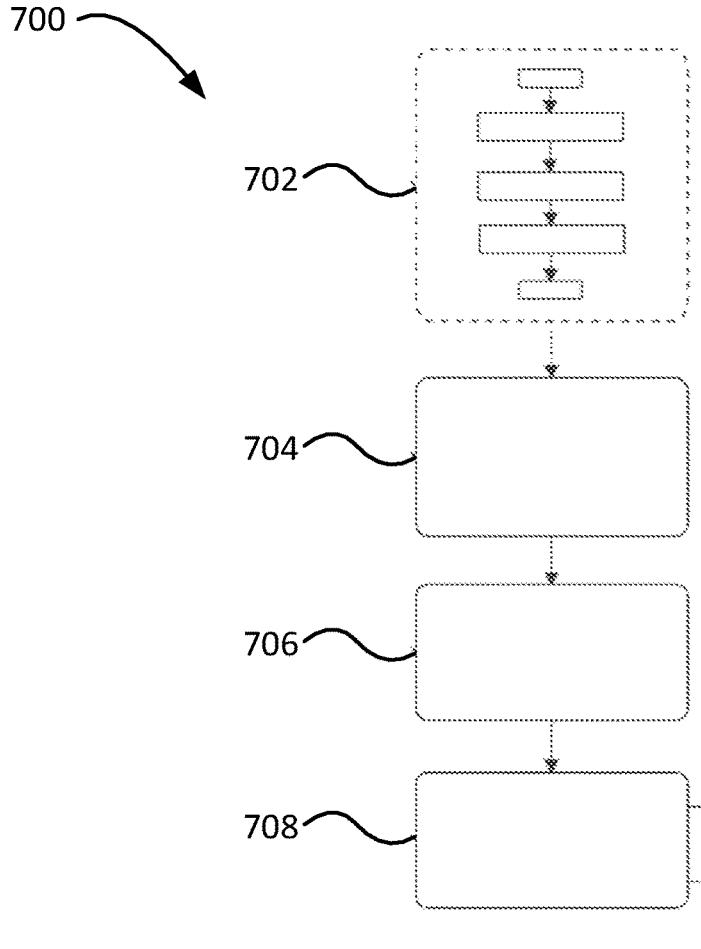
FIG. 7 illustrates an example computer-readable storage medium comprising processor-executable instructions configured to embody one or more of the methods of operating an implement, such as the method illustrated in FIG. 6.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 7, wherein an implementation 700 includes a computer-readable storage medium 702 (e.g., a flash drive, CD-R, DVD-R, application-specific integrated circuit (ASIC), field-programmable gate array (FPGA), a platter of a hard disk drive, etc.), on which is computer-readable data 704. This computer-readable data 704 in turn includes a set of processor-executable instructions 706 configured to operate according to one or more of the principles set forth herein. In some embodiments, the processor-executable instructions 706 may be configured to cause a computer associated with the tractor 100 (FIG. 1) to perform operations 708 when executed via a processing unit, such as at least some of the example method 600 depicted in FIG. 6. In other embodiments, the processor-executable instructions 706 may be configured to control a system, such as at least some of the example tractor 100 and implement 102 depicted in FIG. 1. Many such computer-readable media may be devised by those of ordinary skill in the art that are configured to operate in accordance with one or more of the techniques presented herein.

Additional non limiting example embodiments of the disclosure are described below.

Embodiment 1: An agricultural implement comprising a frame having an integrated elongate toolbar carrying at least one row unit, at least one wheel coupled to the frame, a sensor configured to sense a position of the at least one row unit relative to ground, and an actuator configured to raise or lower the frame relative to the at least one wheel based at least in part on a sensed position of the at least one row unit.

Embodiment 2: The implement of Embodiment 1, wherein the at least one row unit is coupled to the toolbar by a parallel linkage.

Embodiment 3: The implement of Embodiment 2, wherein the sensor comprises a rotary sensor configured to measure an angle of an element of the parallel linkage.

Embodiment 4: The implement of Embodiment 1, wherein the sensor comprises an ultrasonic, lidar, or radar sensor.

Embodiment 5: The implement of any one of Embodiment 1 through Embodiment 4, further comprising a controller configured to receive a signal from the sensor and control the actuator based on the signal.

Embodiment 6: The implement of Embodiment 5, further comprising a control component configured to drive the actuator, wherein the controller is configured to send a control signal to the control component.

Embodiment 7: The implement of Embodiment 6, wherein the control component comprises a control valve, an air valve, an electronic control component, a magnetic control component, or an electromagnetic control component.

Embodiment 8: The implement of any one of Embodiment 1 through Embodiment 6, further comprising a second sensor configured to sense a position of the at least one wheel relative to the frame.

Embodiment 9: The implement of Embodiment 8, wherein the actuator is configured to raise and lower the frame relative to the at least one wheel based in part on the sensed position of the at least one wheel relative to the frame.

Embodiment 10: The implement of any one of Embodiment 1 through Embodiment 9, wherein the toolbar is rotatably coupled to a plurality of adjustable wing sections.

Embodiment 11: The implement of Embodiment 10, further comprising at least another actuator configured to raise or lower a wing section relative to the toolbar.

Embodiment 12: A control system for an implement comprising a frame having an integrated elongate toolbar carrying at least one row unit and at least one wheel coupled to the frame. The control system comprises an actuator connecting the at least one wheel to the frame, a sensor configured to sense a position of the at least one row unit relative to ground, and a controller. The controller is configured to receive a signal from the sensor indicating the position of the at least one row unit relative to the ground and cause the actuator to raise or lower the frame based on the sensed position of the at least one row unit.

Embodiment 13: A computer-implemented method for operating an implement that comprises a frame having an integrated elongate toolbar carrying at least one row unit and at least one wheel coupled to the frame. The method comprises receiving an indication of a position of the at least one row unit relative to ground sensed by a sensor and causing an actuator to raise or lower the frame relative to the at least one wheel based at least in part on the indication of the position of the at least one row unit.

Embodiment 14: The method of Embodiment 13, further comprising sensing a position of the at least one wheel relative to the frame.

Embodiment 15: The method of Embodiment 14, wherein causing the actuator to raise or lower the frame relative to the at least one wheel comprises causing the actuator to rotate an arm carrying the at least one wheel relative to the frame based at least in part on the sensed position of the at least one wheel relative to the frame.

Embodiment 16: The method of any one of Embodiment 13 through Embodiment 15, wherein causing the actuator to raise or lower the frame relative to the at least one wheel comprises sending a control signal to a control component associated with the actuator.

Embodiment 17: The method of any one of Embodiment 13 through Embodiment 16, wherein receiving an indication of a position of the at least one row unit relative to ground sensed by a sensor comprises receiving a signal from the sensor.

The structures and methods shown and described herein may be used in conjunction with those shown in U.S. Provisional Patent Application 63/007,130, "Systems Comprising Agricultural Implements Connected to Lifting Hitches and Related Control Systems and Methods," filed Apr. 8, 2020; U.S. Provisional Patent Application 63/007,152, "Agricultural Implements Having Row Unit Position Sensors and a Rotatable Implement Frame, and Related Control Systems and Methods," filed Apr. 8, 2020; and U.S. Provisional Patent Application 63/007,182, "Agricultural Implements Having Row Unit Position Sensors and Actuators Configured to Rotate Toolbars, and Related Control Systems and Methods," filed Apr. 8, 2020. All references cited herein are incorporated herein in their entireties. If there is a conflict between definitions herein and in an incorporated reference, the definition herein shall control.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various agricultural machine types and configurations.

What is claimed is:

1. An agricultural implement, comprising:
a frame having a fixed rigid structure including a drawbar, a hitch, and an integrated elongate toolbar, the toolbar carrying at least one row unit coupled to the toolbar by a parallel linkage;
at least one wheel coupled to the frame at a position leading the toolbar when the implement travels in a normal forward direction of travel;
a rotary sensor configured to sense a position of the toolbar relative to ground when the at least one row unit is in contact with the ground by measuring an angle of an element of the parallel linkage; and
an actuator configured to raise or lower the frame relative to the at least one wheel based at least in part on a sensed position of the toolbar.

2. The implement of claim 1, further comprising a controller configured to receive a signal from the sensor and control the actuator based on the signal.

3. The implement of claim 2, further comprising a control component configured to drive the actuator, wherein the controller is configured to send a control signal to the control component.

4. The implement of claim 3, wherein the control component comprises a control valve, an air valve, an electronic control component, a magnetic control component, or an electromagnetic control component.

5. The implement of claim 1, further comprising a second sensor configured to sense a position of the at least one wheel relative to the frame.

6. The implement of claim 5, wherein the actuator is configured to raise and lower the frame relative to the at least one wheel based in part on the sensed position of the at least one wheel relative to the frame.

7. The implement of claim 1, wherein the toolbar is rotatably coupled to a plurality of adjustable wing sections.

8. The implement of claim 7, further comprising at least another actuator configured to raise or lower a wing section of the plurality of adjustable wing sections relative to the toolbar.

\* \* \* \* \*